United States Patent Office 3,017,780
Patented Jan. 23, 1962

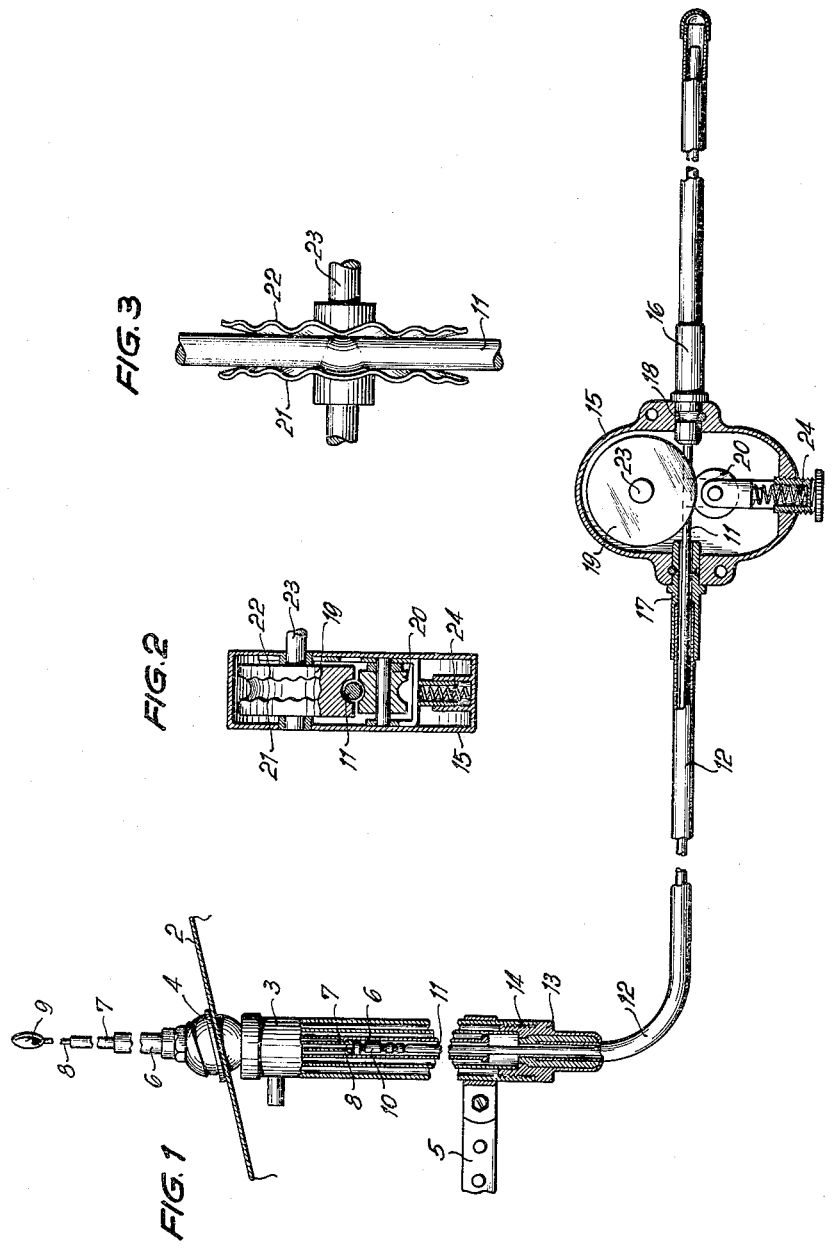

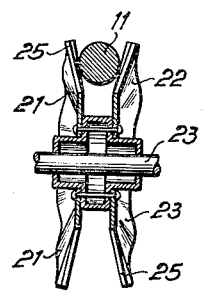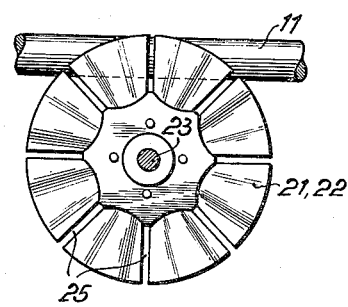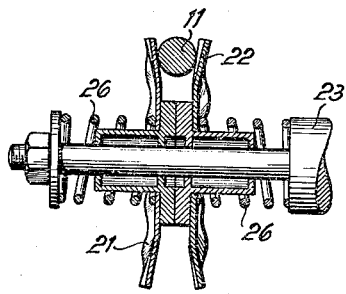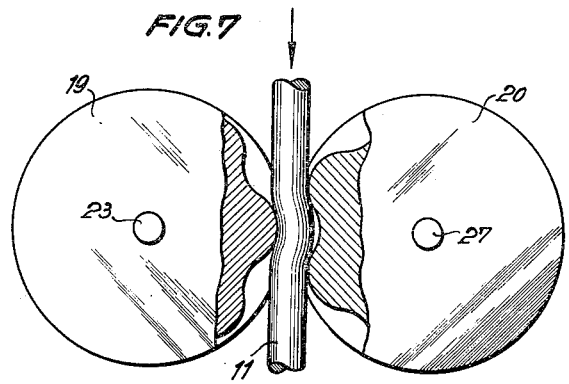

3,017,780
ELASTICALLY YIELDING CONVEYING MEANS
FOR TELESCOPIC ANTENNAE
Klaus Kienhöfer, Niefern, Baden, Germany, assignor to Wilhelm Sihn, Jr. K.G., Niefern, Baden, Germany, a firm
Filed Sept. 22, 1953, Ser. No. 381,540
Claims priority, application Germany Mar. 9, 1953
12 Claims. (Cl. 74—95)

The present invention relates to antennae, and is particularly directed to a novel type of elastically yielding conveying means for telescopic antennae of the type used on motor vehicles.

Mechanically operated elastically yielding conveying means of plastic material, or conveying means consisting of a steel band or strip are already known to the art. In constructions of this known type the teeth of gear wheels engage in corresponding recesses of the conveying means. But devices of this kind have the disadvantage that the conveying means are too much weakened by the recesses, and that in case of obstructions through ice and dirt, the recesses or teeth refuse to function in an orderly manner.

It is also known to operate the conveying means of antennae with the aid of rollers provided with smooth surfaces, and between which the conveying means are clampingly fed forward or retracted into position of rest. But in constructions like this the difficulty arises that in case of the aforesaid obstructions through ice and dirt, the clamping or frictional contact does frequently not suffice to produce the required result.

In addition to that, both of these known ways of conveyance, the mechanical conveyance as well as the frictional conveyance, have the further drawback that the diameter of the conveying means has to be the same throughout its entire length.

The invention obviates all of these disadvantages of known devices by the use of a rotating actuating member provided with undulating body portions or surfaces, whereby the undulating surfaces may extend parallel or at an angle to the axis of the driving shaft of the actuating member. But it is also possible to devise the construction in such a way that the rotating actuating member consists of a circumferentially grooved wheel having at least one of the side-walls facing said groove provided with an undulating surface.

Particularly a device of the latter kind actuates the conveying means, independently of its cross-section, with almost constantly uniform efficiency, so that also offset conveying means can be used, without the requirement of arranging the actuating device farther away from the entering end of the antenna than would be necessary for uniformly cross-sectioned conveying means. On the other hand, the frictional contact or clamping contact is not so great that damage can be caused to the conveying means or to the actuating device in case of obstructions, or when the antenna has reached its final position.

If a circumferentially grooved actuating wheel is employed, it is advisable that both of the side-walls facing the groove are of undulating shape and so formed that projecting undulating portions of one side-wall confront receding undulating portions of the other side-wall. The conveying means is then, because of the pressure exerted by the side-walls upon its elastically yielding body during its passage between the side-walls, slightly undulately bent, so that a considerable frictional contact between the conveying means and the undulating side-walls is thereby produced.

If, furthermore, one or both of the side-walls facing the groove are resiliently devised, that is to say, for resiliency in axial direction of the driving shaft of the wheel, it will be seen that by means of an actuating member of this kind also stepwise offset conveying means can be actuated, which is of particular advantage if a telescopic antenna provided with a plurality of thin tubes near its top end is to be employed.

The aforesaid resiliency will be obtained if the side-walls consist of a plurality of springy sheet metal members separated from each other by radially extending intervening slots. But it is also possible to devise the construction in such a way that the side-walls are resiliently urged in a direction toward each other by means of helical springs mounted on the driving shaft of the wheel.

The conveying means, whose angle of contact should be as large as possible, is retained by counter pressure exerting means in its position upon the undulating body portions, or in the circumferential groove of the rotating actuating member.

These counter pressure exerting means may also consist of a body which is likewise rotatably mounted on a driving shaft, and which, if the undulating portions of the actuating member extend parallel or at an angle to the axis of the driving shaft, is likewise provided with undulating portions in such a way that the projecting undulating portions of one of the rotating members confront receding undulating portions of the other rotating member. The counter pressure exerting body may consist of a spring-pressed roller, or of a spring-pressed plate.

An actuating device as disclosed in the present invention permits the use of stepwise offset plastic conveying means in direct manner, that is to say, in such a way that the plastic conveying means are directly acted upon by the actuating device.

It further makes it possible to devise the antenna in such a way that its use in motor cars is thereby considerably facilitated. It is a well-known fact that in the limited space available in motor cars, retractable antennae are hard to arrange and hard to dismount. In telescopic antennae of the known kind the substitution of a new part for an old one is, therefore, a very cumbersome matter. For, in cases like this, the antenna has to be dismounted, then to be sent to the factory for repairs, and then, after its return from the factory, to be re-arranged in the car.

In order to obviate this troublesome procedure the invention devises the construction (particularly a form of construction in which the protective tubular casing of the antenna and the actuating device, are separately arranged in the car body) in such a way that the individual parts of the construction are exchangeably fastened to each other.

In a construction like this it is now possible for a motor car mechanic to remove, in case of necessity, the conveying means from the device and to replace it by a new one, or to dismount merely the actuating device, while the antenna and the protective tubular casing of the latter remain in the car.

Particularly susceptible to obstructions of various kinds are the telescopic tubes. It is, therefore, an advantage of the novel construction that also the sets of telescopic tubes can be exchanged without difficulty.

For this purpose the construction is so devised that the metal tubes, serving as guiding means for the conveying means, are detachably fastened at the aforesaid protective tubular casing of the antenna, and at the casing of the actuating device, whereby the fastening may be effected with the aid of screw connections or plug connections. If plug connections are used, they should preferably be provided with particular locking means.

If the top member at the upper end of the innermost antenna rod, which usually is of ball-like shape, is detachably secured to the antenna rod, it is possible to retract the rod and the conveying means fastened to its lower end from the surrounding protective tubular casing. Whereupon the conveying means can easily be detached from the rod and replaced by a new one.

Additional features and advantages of the invention will be understood from a consideration of the following detailed description taken in connection with the accompanying drawings, forming a part of this specification, and in which several embodiments of the invention have been shown by way of illustration. However, I wish to say that the invention is not confined to any strict conformity with the showing of the drawings, but may be changed or modified, so long as such changes or modifications mark no material departure from the salient features of the invention as expressed in the appended claims.

In the drawings in which like parts are referred to by the same reference numerals FIG. 1 is a fractional view, partly in section, of a telescopic antenna provided with an actuating device for the actuation of a conveying cord or rod of plastic material;

FIG. 2 is a sectional view of the actuating device of FIG. 1;

FIG. 3 is a top view of an actuating wheel, showing how the flexible conveying cord or rod is positioned between the undulating side-walls of the actuating wheel;

FIG. 4 is a sectional view of an actuating wheel provided with resilient side-walls;

FIG. 5 is a side elevation of the actuating wheel of FIG. 4;

FIG. 6 is a sectional view of an actuating wheel provided with spring-pressed side-walls;

FIG. 7 is a side elevation of a pair of cooperating actuating rollers provided with undulating body portions, portions of the rollers having been broken away to show the undulating portions.

Referring now to the drawings in detail, the reference numeral 2 designates the car body, to which the protective tubular casing 3 is attached. The casing 3 is fastened to the car body by means of the screw connection 4 and, in addition to that, by means of the clip 5. When the antenna is in retracted position, the casing 3 surrounds the telescopic tubes 6 and 7 as well as the antenna rod 8, provided at its outer end with the top member 9. The rod 8 is connected with the conveying means 11 via a coupling member 10. Fastened in the lower end of the protective casing 3 is a metal tube 12 by means of the screw joint 13, 14. Through the tube 12 the conveying means 11 pass to the actuatnig device housed in the casing 15, traverse the actuating device, and then pass into another metal tube 16, forming the storing means for a portion of the conveying means when the antenna is in retracted position. The tubes 12 and 16 are secured to the casing 15 with the aid of the plug fastening means 17 and 18. The casing 15 houses the actuating wheels or rollers 19 and 20 by means of which the conveying means 11 are clampingly fed forward and backward. The conveying means usually consist of a cord or rod of flexible plastic material. For extracting the conveying means 11 from the device, the top member 9 has to be removed from the rod 8, and the connecting means 13, 14 screwed out of the lower end of the casing 3, whereupon the conveying means 11, as well as the rod 8 fastened to them, can be pulled out of the casing 3 and out of the tubes 12 and 16. If, thereupon, the connecting member 10 is detached from the conveying means, the latter can be removed and be replaced by a new one in reversed order.

The procedure is a similar one if at the actuating device 15, or at the antenna, a new part has to be substituted for a defective one. When, therefore, a part has ceased to function, it is now no longer necessary to disengage the entire antenna means from the car and to send them to the factory for overhauling. But every motor car mechanic will now be able to take the antenna means apart and to arrange the spare part himself as soon as the latter has been received from the manufacturer.

According to the invention the rotatable actuating members 19 and 20 are so devised that they automatically adjust themselves to variations in cross-section of the conveying means 11. The circumferentially grooved wheel 19 is mounted on a rotatable shaft 23. The lateral walls 21 and 22 of the circumferential groove are of corrugated or undulating shape (see FIGS. 2 and 3). That is why the flexible conveying means 11 likewise assume a more or less undulating form (see FIGS. 3 and 7). The roller 20 forces the conveying means 11 into the groove of the wheel 19, for which purpose the roller 20 is resiliently mounted on a spring 24. In the embodiment illustrated in FIG. 2, the roller 20 is likewise provided with a circumferential groove.

It is further possible to provide the grooved wheel 19 not only with undulating-, but also resilient side-walls 21 and 22, as shown in FIGS. 4 and 6. According to FIG. 5 these side-walls 21 and 22 consist of springy sheet metal members provided with radial slots 25, while in the embodiment illustrated in FIG. 6 the side-walls 21 and 22 are urged in a direction toward each other by means of helical springs 26 mounted on the shaft 23, whereby the groove between the side-walls is preferably of somewhat conical shape.

In the embodiment of FIG. 7 the actuating rollers 19 and 20 are of uniform diameter and provided in their circumferential surface with undulating body portions. In a construction of this type the driving shafts 23 and 27 of the two rollers are rotated in opposite directions.

A device as disclosed in the present invention may be used with advantage also for other purposes in which flexible power transmitting means have to be actuated, for instance for various kinds of operating actions employed in shipbuilding, engineering, conveying equipment, in the construction of apparatus, in architecture (moving of windows and doors).

What I claim as new and desire to secure by Letters Patent of the United States is:

1. In a device for the actuation of telescopic antennae used on motor vehicles the combination with the telescopic tubes and rod means of an antenna, of a drive rod of elastically yielding plastic material fastened at one end to said antenna rod; a rotatable actuating member for said drive rod, said actuating member consisting of a rotatably mounted wheel provided with a circumferential groove, the sidewalls embracing said groove being formed in such a manner that contact portions of one sidewall for exerting pressure on said drive rod confront recessed non-contacting portions of the other sidewall so as to generate alternating pressure regions and regions free from pressure on opposite sides of said drive rod; pressure exerting means cooperating with said rotatable actuating member and forcing said elastically yielding drive rod into frictional gripping engagement with said alternating contact portions of said rotatable actuating member; a casing in which said actuating member and pressure exerting means are accommodated; and tubular guiding means for said drive rod connected to said casing and an antenna part.

2. A device for the actuation of telescopic antennae as specified in claim 1, including a rotatable shaft on which said wheel is rotatably supported; and in which at least one of the side-walls embracing said circumferential groove is resiliently mounted on said shaft for resiliency in axial direction of the latter.

3. A device for the actuation of telescopic antennae as specified in claim 1, in which said side-walls embracing said circumferential groove are of springy construction.

4. A device for the actuation of telescopic antennae as specified in claim 1, in which said side-walls embracing said circumferential groove are provided with a plurality of metal members bearing said contact portions and separated from each other by intermediate radial slots.

5. A device for the actuation of telescopic antennae as specified in claim 1, including a rotatable shaft on which said wheel is rotatably supported; and in which said wheel consists of a pair of confronting side-walls axially displaceably mounted on said shaft, spacing means provided at the insides of said confronting sidewalls and adapted to secure said side-walls at predetermined minimum distance from each other for the formation of said circumferential groove between said sidewalls, and a pair of compression springs mounted on said shaft at the outsides of said side-walls and adapted to urge said axially displaceable side-walls in a direction toward each other against the separating pressure exerted upon said side-walls by said drive rod.

6. A device for the actuation of telescopic antennae as specified in claim 1 in which said pressure exerting means consist of an adjustable spring-pressed roller.

7. A device for the actuation of telescopic antennae as specified in claim 1, in which said pressure exerting means consist of a second rotatable actuating member, so that said drive rod is positioned between said rotatable actuating members first and second occurrence and clampingly actuated by both of them.

8. A device for the actuation of telescopic antennae as specified in claim 1, in which said pressure exerting means consist of a second rotatable actuating member likewise provided with contact portions, so that said drive rod is positioned in a slightly undulating path formed between the contact portions of said rotatable actuating members first and second occurrence and grippingly actuated by both of them, said contact portions of said actuating members being so devised and arranged with respect to each other that contact portions of one actuating member confront recessed intermediate portions of the other actuating member.

9. A device for the actuation of telescopic antennae as specified in claim 1, in which said elastically yielding drive rod is of stepwise offset formation in accordance with the dimensions of the telescopic antennae tubes through which it is moving.

10. A device for the actuation of telescopic antennae as specified in claim 1, including a protective casing for the telescopic tubes and rod of the antenna; and in which said tubular guiding means of said drive rod are detachably secured to said protective casing and to said casing of said actuating member and pressure exerting means with the aid of plug fastening means provided with locking contrivances.

11. In a device for the actuation of an antenna for motor vehicles comprising a drive rod with a free end terminating in an antenna, which drive rod is of elastically yielding material and has substantially circular cross section, the combination with said drive rod of actuating means comprising a rotatable disc-shaped member provided with a circumferential groove embraced by opposite sidewalls, said sidewalls comprising alternately contact regions in contact with said drive rod, and recessed non-contacting regions out of contact with said drive rod, the contact regions of one groove sidewall being substantially opposite non-contacting regions of the other sidewall of said groove; and pressure means cooperating with said rotatable member and urging said drive rod into frictional gripping engagement with said contact regions alternately arranged on both sides of said groove, thereby generating alternating pressure regions on opposite sides of said drive rod as the latter passes along said actuating means.

12. In a telescopic antenna the combination of an elongated flexible drive rod of substantially circular cross-section, the free end of which drive rod is associated with the antenna; supporting means; substantially disc-shaped driving means having a central axis and being mounted on said supporting means for turning movement relative thereto about said central axis, said driving means comprising a pair of friction means arranged circumferentially about said disc-shaped driving means and rigidly connected thereto, and arranged substantially in parallel with each other so as to embrace a circumferential groove therebetween, said friction means comprising a plurality of contacting portions for exerting pressure on the surface of said drive rod, and intermediate recessed areas between said contacting portions wherein no pressure is exerted on said drive rod, pressure means displaceably mounted on said supporting means for movement in radial direction relative to the central axis of said driving means, spring means for urging said pressure means in radial direction toward said central axis, thereby urging said drive rod into frictional engagement with said groove; said contacting portions in one of said friction means being disposed substantially opposite the recessed areas between contacting portions of the opposite friction means, thereby enhancing the gripping effect of said driving means on said drive rod by causing a very slight, temporary undulating deformation of the rod while being in contact with said groove.

References Cited in the file of this patent

UNITED STATES PATENTS

| | | |
|---|---|---|
| 902,224 | Fouillaron | Oct. 27, 1908 |
| 1,601,662 | Abbott | Sept. 28, 1926 |
| 1,792,921 | Newhouse | Feb. 17, 1931 |
| 2,233,222 | Paton | Feb. 25, 1941 |
| 2,581,171 | Carlson | Jan. 1, 1952 |
| 2,617,933 | Noel | Nov. 11, 1952 |